(12) United States Patent
Yamaguchi

(10) Patent No.: US 11,596,500 B2
(45) Date of Patent: Mar. 7, 2023

(54) TOOTH MOVING DEVICE

(71) Applicant: Shuji Yamaguchi, Saitama (JP)

(72) Inventor: Shuji Yamaguchi, Saitama (JP)

( * ) Notice: Subject to any disclaimer, the term of this patent is extended or adjusted under 35 U.S.C. 154(b) by 0 days.

(21) Appl. No.: 17/419,691

(22) PCT Filed: Dec. 12, 2019

(86) PCT No.: PCT/JP2019/048603
§ 371 (c)(1),
(2) Date: Jun. 29, 2021

(87) PCT Pub. No.: WO2020/145016
PCT Pub. Date: Jul. 16, 2020

(65) Prior Publication Data
US 2022/0039922 A1 Feb. 10, 2022

(30) Foreign Application Priority Data

Jan. 7, 2019 (JP) .............................. JP2019-000448

(51) Int. Cl.
*A61C 7/10* (2006.01)
(52) U.S. Cl.
CPC ...................... *A61C 7/10* (2013.01)
(58) Field of Classification Search
CPC .... A61C 7/00; A61C 7/10; A61C 7/14; A61C 7/145; A61C 7/18; A61C 7/20; A61C 7/22; A61C 7/282; A61C 8/0096
See application file for complete search history.

(56) References Cited

U.S. PATENT DOCUMENTS 5,007,828 A * 4/1991 Rosenberg ............... A61C 7/00
433/17
5,769,630 A * 6/1998 Hoffman .............. A61B 17/663
433/173

(Continued)

FOREIGN PATENT DOCUMENTS

DE 202010008972 U1 * 5/2011 ............... A61C 7/00
DE 202012011899 * 3/2013

(Continued)

OTHER PUBLICATIONS

DPMA, Office Action from German Patent and Trade Mark Office dated Sep. 24, 2021 in DE112019006579.3, 12 pages with English Translation.

(Continued)

*Primary Examiner* — Edward Moran
*Assistant Examiner* — Matthew P Saunders
(74) *Attorney, Agent, or Firm* — Masuvalley & Partners; Peter Martinez

(57) ABSTRACT

A tooth moving device 1 according to the present invention comprises: a track part 6 extending from a mesial end 4 to a distal end 5 along a palate-side teeth alignment; a sliding part 7, slidably attached to the track part 6, and engaging with a holding member 51 attached to a maxillary posterior tooth; a lock part 8 fixed to the track part 6 close to the mesial end 4 relative to the sliding part 7; an elastic part 9 intervening between the lock part 8 and the sliding part 7 to bias the sliding part 7 toward the distal end; and anchoring part 2 and 3, anchored to an implanted member 53 implanted into a palate, and connected to the distal end 5.

7 Claims, 3 Drawing Sheets

(56) References Cited

U.S. PATENT DOCUMENTS

| | | | |
|---|---|---|---|
| 5,785,520 A * | 7/1998 | Carano | A61C 7/00 433/18 |
| 5,816,800 A | 10/1998 | Brehm et al. | |
| 5,967,772 A * | 10/1999 | Gray | A61C 7/00 433/18 |
| 6,435,870 B1 | 8/2002 | Walde | |
| 6,908,306 B2 * | 6/2005 | Bowman | A61C 7/00 433/18 |
| 7,771,196 B2 * | 8/2010 | Weissbach Otte | A61C 7/10 433/7 |
| 2003/0044746 A1 * | 3/2003 | Marotta | A61C 7/14 433/18 |
| 2003/0091952 A1 * | 5/2003 | Bowman | A61C 7/10 433/7 |
| 2005/0221249 A1 * | 10/2005 | Keles | A61C 7/00 433/18 |
| 2006/0257811 A1 * | 11/2006 | Ohki | A61C 8/00 433/18 |
| 2006/0293673 A1 * | 12/2006 | Morrison | A61B 17/701 606/288 |
| 2007/0015101 A1 * | 1/2007 | Perera | A61C 7/10 433/2 |
| 2009/0311646 A1 | 12/2009 | Winsauer et al. | |
| 2010/0112506 A1 * | 5/2010 | Itsuki | A61C 7/00 433/2 |
| 2011/0165532 A1 * | 7/2011 | Benvegnu' | A61C 7/287 433/18 |
| 2015/0118635 A1 * | 4/2015 | Kwon | A61C 7/145 433/20 |
| 2019/0311646 A1 | 10/2019 | He | |
| 2020/0281692 A1 * | 9/2020 | Galella | A61C 7/30 |
| 2021/0205050 A1 * | 7/2021 | Galella | A61C 7/30 |
| 2021/0338378 A1 * | 11/2021 | Schuetz | A61C 7/10 |

FOREIGN PATENT DOCUMENTS

| | | | |
|---|---|---|---|
| EP | 2130512 B1 | | 12/2009 |
| JP | 2005-270175 A | | 10/2005 |
| JP | 2009-291613 A | | 12/2009 |
| KR | 101466158 B1 | * | 12/2014 |
| WO | 2015025181 | * | 2/2015 |

OTHER PUBLICATIONS

WIPO, Japanese International Search Authority, International Search Report (with English translation) and Written Opinion dated Feb. 4, 2020 in International Patent Application No. PCT/JP2019/048603, 8 pages.

Shuji Yamaguchi et al., "Clinical practice with Benefit System-2: Distalization of maxillary molar by applying Beneslider device," Journal of Orthodontic Practice, Tokyo Clinical Publications, inc., May 2014, pp. 53-59.

* cited by examiner

Prior Art

TOOTH MOVING DEVICE

RELATED APPLICATIONS

This application is the U.S. National Phase of and claims priority to International Patent Application No. PCT/JP2019/048603, International Filing Date Dec. 12, 2019; which claims benefit of Japanese Patent Application No. 2019-000448 filed Jan. 7, 2019; both of which are incorporated herein by reference in their entireties.

TECHNICAL FIELD

The present invention relates to a tooth moving device for distalizing (moving toward a back-teeth side) a maxillary posterior tooth (a maxillary premolar or molar, especially, a maxillary molar).

BACKGROUND ART

Conventionally, a tooth moving device capable of distalizing a maxillary posterior tooth, as shown in the following non-patent Document 1, has been known as a device used for treating Class II malocclusion or crowded anterior teeth without extracting a tooth.

The tooth moving device in the non-patent Document 1 has a small anchor screw (an implanted member) implanted into a premedial part of a palate in order to distalize a maxillary molar using the anchor screw as an anchorage unit. Specifically, as shown in FIG. 4, a maxillary molar to be distalized is fitted with a band-shaped holding member 101 that surrounds it, and an external-threaded anchor screw (not shown) is implanted into a premedial part of a palate. On a palate side of a holding member 101, a tubular part 102 penetrated from a mesial side to a distal side is provided. A head of an anchor screw is provided with an internal thread part, and a low-head fixation screw 104 can be attached to the internal thread part.

A tooth moving device 201 includes a coupling part 202 coupled with an unshown anchor screw by tightening a fixation screw 104, a connecting part 203 which is approximately V-shaped and firmly fixed to a coupling part 202 on a mesial side of the coupling part 202, and a pair of track parts 206 extending from a mesial end (a front-teeth-side end) 204 to a distal end (a back-teeth-side end) 205 along a teeth alignment of a palate side, the mesial ends 204 of which connect to each of left and right ends of a connecting part 203. An illustrated connecting part 203 and a pair of track parts 206 are formed by bending a single wire into an M-shape.

A track part 206 has a sliding part 207 which is slidably attached to the track part 206 and a tip of which is inserted into a tubular part 102 of a holding member 101 from a mesial side to a distal side, a lock part 208 fixed to a track part 206 close to a mesial end 204 relative to a sliding part 207, and a coiled spring (elastic part) 209 inserted into a track part 206 and intervening between a lock part 208 and a sliding part 207 to bias a sliding part 207 toward a distal end 205. An illustrated lock part 208 incorporates a sunk plug. Loosening a sunk plug allows a lock part 208 to move to an arbitrary position of a track part 206, while tightening the sunk plug fixes it to a track part 206.

According to a tooth moving device 201, when a sliding part 207 is biased by a coiled spring 209 toward a distal end 205 while being guided by a track part 206, a force of a coiled spring 209 also acts on a maxillary molar, to which a holding member 101 is attached, through a sliding part 207. In other words, this force enables a maxillary molar to be distalized along a direction in which a track part 206 extends. Also, the magnitude of a force acting on a maxillary molar can be adjusted by changing a position where a lock part 208 is fixed.

PRIOR ART DOCUMENTS

Non-Patent Documents

Non-Patent Document 1: Shuji Yamaguchi and four others, "Clinical practice with BENEFIT SYSTEM-2: Distalization of maxillary molar by applying Beneslider device", Journal of Orthodontic Practice, TOKYO CLINICAL PUBLICATIONS, inc., May 2014.

SUMMARY OF THE INVENTION

Problem to be Solved by the Invention

By the way, in such a conventional tooth moving device 201, a connecting part 203 is provided on a mesial side of a coupling part 202. This makes a tip of a tongue more likely to touch a connecting part 203 and others, which may cause discomfort and may also affect a tongue training by oral myofunctional therapy (MFT).

In addition, moving a lock part 208 in order to adjust a biased force applied by a coiled spring 209 after a tooth moving device 201 is attached to a holding member 101 and an anchor screw is difficult because a connecting part 203 is in front of a lock part 208. Moreover, a space of a palate located on a mesial side relative to a coupling part 202 is relatively small, which inevitably makes a connecting part 203 small. This results in increased curvature of a bent portion when a connecting part 203 and a track part 206 are formed by bending a single wire; that is, increased springback occurred at a wire results in making a track part 206 more likely to move buccally. Thus, a biased force of a coiled spring 209 buccally acting on a maxillary molar may cause failure of desired distalization of a maxillary molar and mesial rotation (rotation of a mesial side of a tooth in a palate-side direction around a long axis of a tooth) of a maxillary molar to be distalized.

In light of the above, the present invention aims to solve the above-mentioned problems related to discomfort of a tongue or the like in wearing a device, and to provide a tooth moving device reducing discomfort of a tongue in wearing the device, and enabling successful tongue training with MFT, as well as realizing desired distalization of a maxillary posterior tooth and preventing mesial rotation of a posterior tooth.

Means of Solving the Problem

The present invention is a tooth moving device for distalizing a maxillary posterior tooth, comprising:

a track part extending from a mesial end to a distal end along a palate-side teeth alignment;

a sliding part, slidably attached to the track part, and engaging with a holding member attached to a maxillary posterior tooth;

a lock part fixed to the track part close to the mesial end relative to the sliding part;

an elastic part intervening between the lock part and the sliding part to bias the sliding part toward the distal end; and an anchoring part, anchored to an implanted member implanted into a palate, and connected to the distal end.

In the tooth moving device, it is preferable that the anchoring part is formed of a coupling part coupled with the implanted member and a connecting part connecting the coupling part to the distal end, that the coupling part is formed of a plate, that the track part and the connecting part are formed of a wire, and that the plate and the wire are fixed on a distal side of the plate.

In the tooth moving device, it is also preferable that the anchoring part is formed of a coupling part coupled with the implanted member and a connecting part connecting the coupling part to the distal end, that the coupling part and the connecting part may be formed of a plate, that the track part is formed of a wire, and that the plate and the wire are firmly fixed at the distal end.

In the tooth moving device, the track part, the sliding part, the lock part, and the elastic part are preferably provided on each of left and right sides relative to the anchoring part.

Effects of the Invention

In a tooth moving device according to the present invention, an anchoring part anchored to an implanted member implanted into a palate is connected to a distal end of a track part, instead of a mesial end as seen in the past. Hence, a connecting part is not provided on a mesial side of a coupling part, and a mesial end of a track part is open. Therefore, the device can reduce discomfort of a tongue in wearing the device and enable successful tongue training with MFT, as well as realize desired distalization of a maxillary posterior tooth and prevent mesial rotation of a posterior tooth.

MODE FOR CARRYING OUT THE INVENTION

Figure 1:
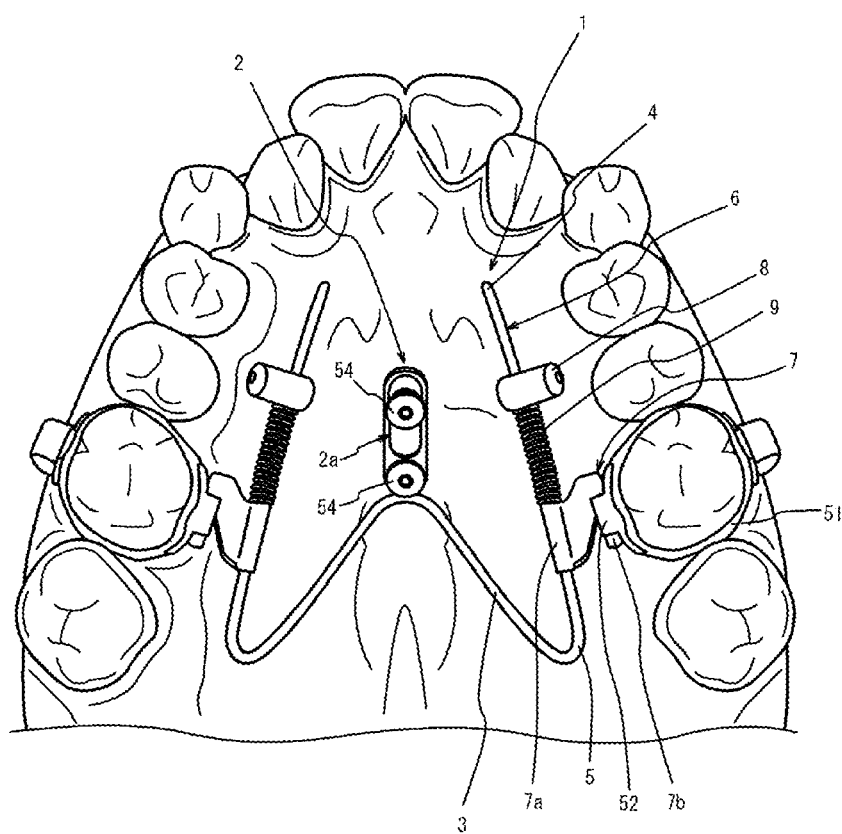
FIG. 1 shows one embodiment of the tooth moving device according to the present invention.
Figure 2:
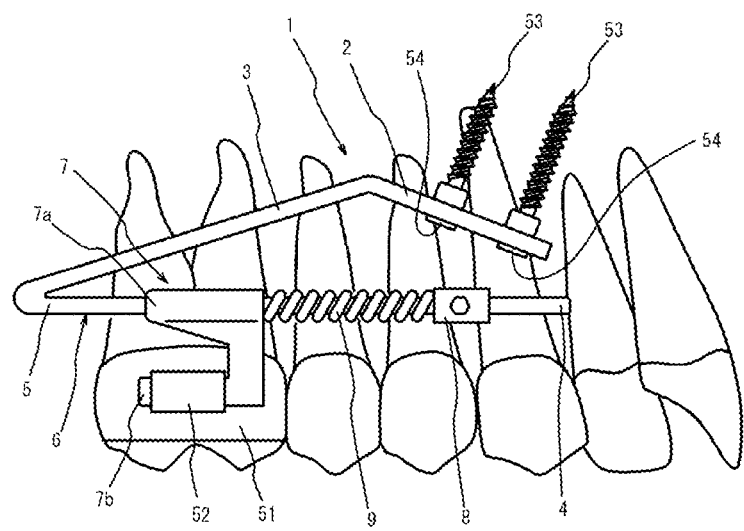
FIG. 2 is a schematic view of the tooth moving device shown in FIG. 1 laterally viewed from a palate side to a buccal side.

One example of a tooth moving device according to the present invention is described below with reference to the Drawings. FIG. 1 and FIG. 2 relate to one embodiment of a tooth moving device and show a state where it is attached to a patient's palate. FIG. 1 is a view facing toward a palate. FIG. 2 is a schematic view laterally viewed from a palate side to a buccal side.

For describing a tooth moving device 1 according to the present embodiment, a holding member 51 and an anchor screw (implanted member) 53 are described first. A holding member 51 has a band-like shape and is attached to a maxillary posterior tooth (a maxillary molar in the present embodiment) to be distalized in such a way as to surround it. On a palate side of the of a holding member 51, a tubular part 52 penetrated from a mesial side to a distal side is provided. An anchor screw 53 shown in FIG. 2 is approximately shaped like an external thread and implanted into a premedial part of a palate to be fixed to a maxillary bone. In the present embodiment, two anchor screws 53 are implanted into a midline of a palate at intervals. A head of an anchor screw 53 has an internal thread part, and a low-head fixation screw 54 can be attached to the internal thread part. The number of anchor screws 53 is not limited to two, and may be more (3, 4, and so on).

Moreover, a tooth moving device 1 according to the present embodiment includes a coupling part 2 coupled with an anchor screw 53 by tightening a fixation screw 54. A coupling part 2 of the present embodiment is formed of a metallic plate and has an elliptic shape with an unshown circular hole for inserting an external thread part of a fixation screw 54 on a distal side and with an elliptic hole 2a for inserting an external thread part of a fixation screw 54 on a mesial side. On a distal side of a coupling part 2, an inverted-V-shaped connecting part 3 which is firmly fixed to a coupling part 2 by such as welding is provided. As shown in FIG. 1, a space in a palate on a distal side of a coupling part 2 is larger than that on a mesial side, which allows a connecting part 3 to be large as illustrated. Note that a coupling part 2 and a connecting part 3 can be collectively referred to as an anchoring part in a following description.

A tooth moving device 1 further includes a pair of track parts 6, the distal ends 5 of which connect to each of left or right ends of a connecting part 3, extending from a mesial end 4 to a distal end 5 along a palate-side teeth alignment. As shown in FIG. 2, a track part 6 extends on substantially the same level of a center of resistance located at a dental root of a maxillary molar. An illustrated connecting part 3 and a pair of track parts 6 are formed by bending a straight wire having a circular cross-sectional shape (into a W-shape from a view facing toward a palate as shown in FIG. 1, and into a quarterly-turned V-shape from a lateral view as shown in FIG. 2), along an inner surface of a palate.

Figure 3:
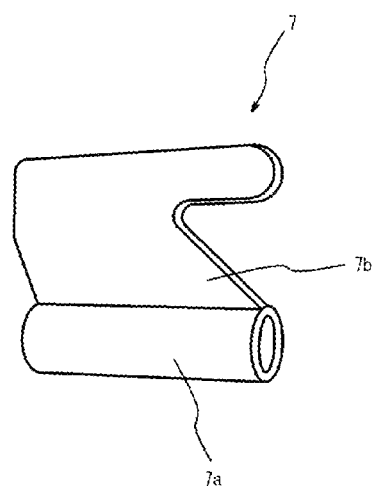
FIG. 3 is a perspective view of a sliding part constituting the tooth moving device shown in FIG. 1.
Figure 4:
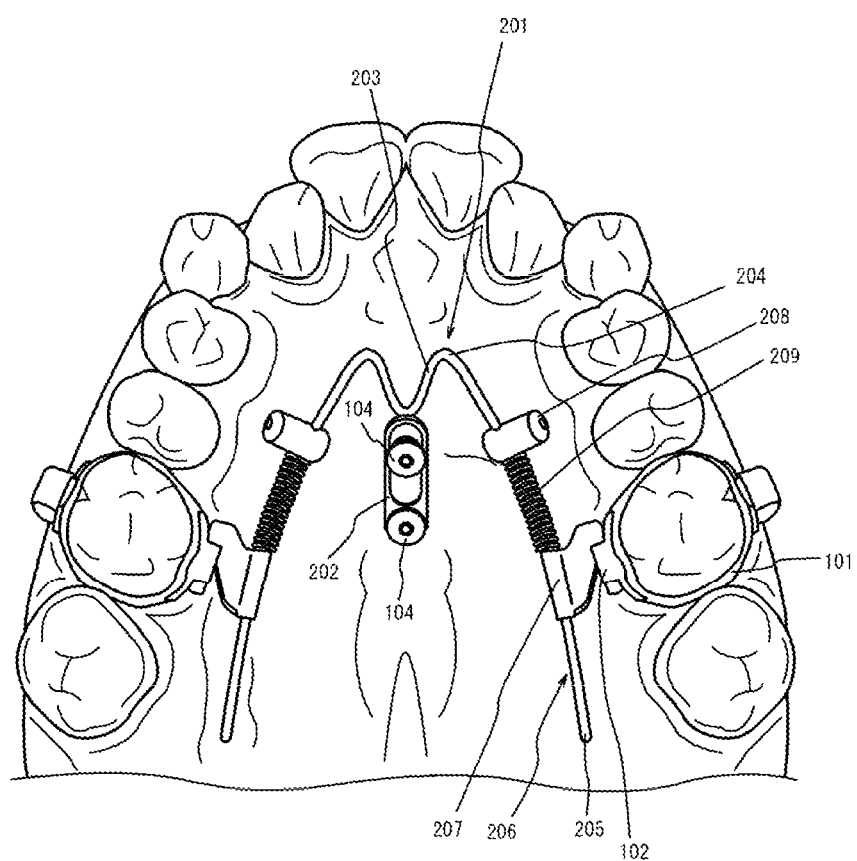
FIG. 4 shows a conventional tooth moving device.

A sliding part 7 formed as shown in FIG. 3 is slidably attached to a track part 6. A sliding part 7 of the present embodiment includes a cylinder part 7a, and a hook part 7b which is formed so as to extend radially outwardly from a cylinder part 7a and then extend along a central-axis direction of a cylinder part 7a. As shown in FIG. 1, a cylinder part 7a is a part into which a track part 6 is inserted. A hook part 7b is a part inserted into a tubular part 52 of a holding member 51 from a mesial side to a distal side.

Furthermore, on a track part 6, a coiled spring (elastic part) 9 and a lock part 8 are attached to a mesial side of a sliding part 7. A coiled spring 9 intervenes between a lock part 8 and a sliding part 7 to bias a sliding part 7 toward a distal end 5. In addition, a lock part 8 incorporates a sunk plug. Loosening a sunk plug allows a lock part 8 to move to an arbitrary position on a track part 6, while tightening a sunk plug fixes it to a track part 6.

With a tooth moving device 1 having such a structure according to the present embodiment, when a sliding part 7 is biased by a coiled spring 9 toward a distal end 5 while being guided by a track part 6, a force of a coiled spring 9 also acts on a maxillary molar with a holding member 51 through a sliding part 7. This enables distalization of a maxillary molar along a direction in which a track part 6 extends. Also, changing a position at which a lock part 8 is fixed can change the magnitude of a force acting on a maxillary molar.

In addition, a tooth moving device 1 according to the present embodiment does not have any components on a mesial side of a coupling part 2, which enables reduction of discomfort felt at a tip of a tongue in the past, successful tongue training with MFT, and easy adjustment of a biased force applied by a coiled spring 9 by virtue of easy reposition of a lock part 8. Moreover, since a lock part 8 can also be moved toward a back side of a mouth as a maxillary molar moves toward a distal side along with the progress of treatment with a tooth moving device 1, a track part 6 can be shortened by cutting off an excess front portion of it. Thus, a tongue no longer touches a front portion of a track part 6, resulting in further reduction of discomfort felt at a tip of a tongue and more successful tongue training with MFT.

Furthermore, with such a tooth moving device 1, a connecting part 3 can be increased in size by using a large space on a distal side of a coupling part 2. This reduces springback of a wire and spring toward a buccal side, which enables placing a track part 6 at an intended position. A sliding part 7, biased by a coiled spring 9 while being guided by a track part 6, moves to converge toward a distal end 5, where misalignment is less likely to occur because of connecting to a connecting part 3, accompanied by a maxillary molar held by a holding member 51. Therefore, a tooth moving device 1 according to the present embodiment enables reducing risk that a force buccally acts on a maxillary molar, which has been concerned for a conventional device. This enables desired distalization of a maxillary posterior tooth and prevention of mesial rotation of a posterior tooth as well.

A tooth moving device according to the present invention is described above based on a specific embodiment. However, a tooth moving device according to the present invention is not limited to the embodiments described so far, but also includes those with various modifications within the scope of the claims.

For example, although a coupling part 2 is formed of a plate, a track part 6 and a connecting part 3 are formed of a wire, and the plate and the wire are firmly fixed on a distal side of the plate in the above-mentioned embodiment, a coupling part and a connecting part may be formed of a plate, a track part may be formed of a wire, and the plate and the wire may be firmly fixed at a distal end 5. In forming a connecting part and a track part by bending a wire, there is a concern that a track part may move buccally to some extent due to the spring of a bent part. However, with this structure eliminating an effect of spring by bending, a track part can be more reliably prevented from moving buccally. Moreover, there is also an advantage in terms of fabricability that firmly fixing a connecting part and a track part makes it easy to place them in an intended orientation compared to forming a connecting part and a track part by bending a wire. In forming a coupling part and a connecting part by a plate, a plate preliminarily formed to be flat may be bent along an inner surface of a palate, or data related to a three-dimensional shape of an inner surface of a palate may be acquired and applied to a three-dimensional molding machine to form a shape along an inner surface of a palate from the begging. Such an embodiment brings about the same effect as in an illustrated embodiment that a track part can be placed at an intended position, and also provides a good fit brought by precise formation along an inner surface of a palate by a three-dimensional molding machine.

Furthermore, in an illustrated embodiment, a means of firmly fixing a coupling part 2 and a connecting part 3 is not limited to welding, but other means such as swaging may be adopted. In addition, although an illustrated mesial end 4 extends linearly, it may be bent after a lock part 8 is inserted to prevent a lock part 8 from falling off. Furthermore, if it is not necessary to move a lock part 8 relative to a track part 6, a lock part 8 may be immovably fixed to a track part 6 using such as swaging. Although a track part 6 is provided on both left and right sides in the above-mentioned embodiment, it may be provided only on one side as needed.

DENOTATION OF REFERENCE NUMERALS 1 tooth moving device
2 coupling part (anchoring part)
3 connecting part (anchoring part)
4 mesial end
5 distal end
6 track part
7 sliding part
8 lock part
9 coiled spring (elastic part)
51 holding member
53 anchor screw (implanted member)

What is claimed is:

1. A tooth moving device for distalizing a maxillary posterior tooth, comprising:
   a track part extending from a mesial end to a distal end along a palate-side teeth alignment;
   a sliding part, slidably attached to the track part, and engaging with a holding member configured to be attached to a maxillary posterior tooth;
   a lock part fixed to the track part close to the mesial end relative to the sliding part;
   an elastic part intervening between the lock part and the sliding part to bias the sliding part toward the distal end; and
   an anchoring part, anchored to an implanted member configured to be implanted into a palate, and directly connected to the distal end of the track part, wherein the distal end of the track part exists distally relative to the holding member;
   wherein the elastic part is attached to a mesial side of the sliding part on the track part; and
   wherein the lock part incorporates a sunk plug, whereby loosening the sunk plug allows the lock part to move to an arbitrary position on the track part, while tightening the sunk plug fixes the lock part to the track part.

2. The tooth moving device according to claim 1,
   wherein the anchoring part is formed of a coupling part coupled with the implanted member and a connecting part connecting the coupling part to the distal end;
   wherein the coupling part is formed of a plate;
   wherein the track part and the connecting part are formed of a wire; and
   wherein the plate and the wire are fixed on a distal side of the plate.

3. The tooth moving device according to claim 1,
   wherein the anchoring part is formed of a coupling part coupled with the implanted member and a connecting part connecting the coupling part to the distal end;
   wherein the coupling part and the connecting part are formed of a plate;
   wherein the track part is formed of a wire; and
   wherein the plate and the wire are fixed at the distal end of the track part.

4. The tooth moving device according to claim 1, wherein the track part, the sliding part, the lock part, and the elastic part are provided on each of left and right sides relative to the anchoring part.

5. The tooth moving device according to claim 2, wherein the track part, the sliding part, the lock part, and the elastic part are provided on each of left and right sides relative to the anchoring part.

6. The tooth moving device according to claim 3, wherein the track part, the sliding part, the lock part, and the elastic part are provided on each of left and right sides relative to the anchoring part.

7. The tooth moving device according to claim 1, wherein the elastic part is a coiled spring.

* * * * *